(12) United States Patent
Grettve et al.

(10) Patent No.: US 6,591,243 B1
(45) Date of Patent: Jul. 8, 2003

(54) METHOD AND SYSTEM FOR SUPPLY CHAIN CONTROL

(75) Inventors: Per Grettve, Lund (SE); Hans Wöhrman, Falsterbo (SE); Steffen Abrahamsson, Lund (SE)

(73) Assignee: MA-System AB, Lund (SE)

( * ) Notice: Subject to any disclaimer, the term of this patent is extended or adjusted under 35 U.S.C. 154(b) by 0 days.

(21) Appl. No.: 09/422,130

(22) Filed: Oct. 20, 1999

(51) Int. Cl.$^7$ ................................................. G06F 17/60
(52) U.S. Cl. .............................. 705/8; 705/78; 700/100
(58) Field of Search ........................ 705/28, 1, 7–10, 705/35, 39, 37; 700/100

(56) References Cited

U.S. PATENT DOCUMENTS

| | | | | |
|---|---|---|---|---|
| 5,440,480 A | * | 8/1995 | Costanza ...................... | 705/28 |
| 5,712,989 A | * | 1/1998 | Johnson et al. ............... | 705/28 |
| 5,809,479 A | * | 9/1998 | Martin et al. ................. | 705/11 |
| 5,953,707 A | * | 9/1999 | Huang et al. ................. | 705/10 |
| 6,167,385 A | * | 12/2000 | Hartley-Urquhart ......... | 705/35 |

FOREIGN PATENT DOCUMENTS

| EP | 770962 | * | 5/1997 | .................... 705/8 |
|---|---|---|---|---|

OTHER PUBLICATIONS

Sunday Times, Putting Zip Into Supply Chain; Logistics, May 23, 1999.*
Business Wire, SAP Delivers SAP APO, Cornerstone of Synchronized Planning and Execution Components of Supply Chain Management Solution; New Components Extend Supply Chain Capabilites, Sep. 14, 1998.*

* cited by examiner

*Primary Examiner*—Richard Chilcot
(74) *Attorney, Agent, or Firm*—Jenkens & Gilchrist, P.C.

(57) ABSTRACT

In a method of controlling the flow and balance of goods and related information from point of origin to point of consumption in a logistics system, customer and customer's customer product information including product balance data and outflow dement data are received from a customer by a supplier. Based on the customer product information and delivery agreement data between the supplier and the customer, a demand time for refilling of a customer storage is determined and stored by the supplier, and based on the customer product information, the delivery agreement data, and the demand time, delivery time and customer demand quantity data for customer storage are determined and stored by the supplier. A delivery suggestion is created, and a delivery corresponding to the delivery suggestion is executed.

27 Claims, 6 Drawing Sheets

METHOD AND SYSTEM FOR SUPPLY CHAIN CONTROL

1. Field of the Invention

The present invention relates to a method and system for logistics and more particularly to a method and system for supply chain or network control of the flow and balance of goods and related information from point of origin to point of consumption.

2. Description of the Prior Art

With reference to The New Encyclopedia Britannica Volume 28, logistics means the process of planning, implementing, and controlling the flow and storage of goods, services, and related information from point of origin to point of consumption for the purpose of conforming to customer requirements.

Further, a logistics system involves logistics management, control, planning, and customer service, which can be placed within a single logistics department or shared among several departments in a company.

Users of logistics systems are for example manufacturing industries, and retail chain stores, but also service industries such as banks and public authorities etc.

Documentation flow, inventory management, order processing and packaging, production scheduling, purchasing, and distribution management etc, are all important activities needed in a modern logistics system.

A lot is documentation is involved in logistics and is often interchanged electronically. Delivery agreements, orders, and packing lists are some documents in the documentation flow.

Companies move products and components between its plants during the production process, and inventory replenishment systems strive to obtain small resupply deliveries to be made just as they are needed, because there are costs associated with holding inventories including storage costs, obsolescence etc.

In prior art systems order processing starts with an order from a customer. It may be obtained by a phone call, an ordinary mail, or even an e-mail from a buyer to a seller. As the buyer's inventories become low, an electronic purchase order is generated. It is sent to the seller, whose computers will determine that the goods are available, and the seller will inform the buyer that the order will be filled and shipped by a certain time. After some verification steps instructions are sent to a warehouse to fill the order. At the warehouse the specific order is assembled and packed for shipment. Transportation documents are prepared, an invoice is sent to the buyer and the goods is delivered.

A problem associated with prior art logistics systems is to obtain an efficient logistics control and production scheduling and an equalised flow from a source to a destination in a supply chain in order to balance demand for products with plant capacity and availability of inputs. Inbound materials and components must be scheduled to fit into the production process. The production process itself is scheduled to fulfill existing and planned orders. Manufactured products must be scheduled for shipment to wholesalers, retailers, and customers. For example, if the firm is running a special advertising campaign to promote its product, the additional products must be available for sale. Depending on these variations in product demand it is difficult to obtain an efficient production scheduling to fulfill the order requirements of the end customers.

In prior art logistics system different activities are linked by communication in order to coordinate and managing logistics. A customer buys merchandise in a store having a scanner at the checkout counter linked directly to the chain's home office so that it has instantaneous information as to what is being sold. Thus, the store can be restocked when necessary rather than having a large inventory at the store. In the next step the home office orders merchandise from a producer based on information collected from its stores. However, the supplier or producer does not know about the real demands from the stores, just a total demand from each store associated with that home office. Several home offices of different chain stores may order from the same producer.

For example, two stores associated with a first home office may have uniform demands from customers over the time for a particular product but on different levels. A second home office has two other associated stores also having uniform demands from its customers over the time for that particular product but on other levels. Each shop needs a particular quantity of products within a time interval. The quantity and/or the time interval can be different for each shop. Information about the demands from each shop is received at its home office. A predetermined order quantity is issued when the home offices order products from the producer within a time interval. As for the shops the time interval as well as the order quantity may differ between the different home offices. Thus, even if the demands from the customers are almost uniform over the time the producer receives orders varying sometimes vary much. It is therefore very difficult to obtain an efficient logistics control and production scheduling and an equalised flow from a source to a destination in a supply chain.

In order to achieve efficient logistics demand forecasting has been used. Information concerning delivery to customers and receipt of raw materials or components are relevant in order to make good decisions, and customers ordering are needed for production control and scheduling, and coordinating and managing logistics. However, demand forecasting is a time consuming, expensive and cumbersome process.

SUMMARY OF THE INVENTION

It is an object of the present invention to provide an improved method and system for supply chain control, in order to obtain efficient flow of goods, production scheduling, and order processing.

This is accomplished by the method and system according to the invention, wherein updated and recent customer and customer's customer product information is provided at a supplier for the generation of a delivery suggestion at a supplier in order to refill products at its customers.

BRIEF DESCRIPTION OF THE DRAWINGS

In order to explain the invention in more detail and the advantages and features of the invention a preferred embodiment will be described in detail below, reference being made to the accompanying drawings, in which.

DETAILED DESCRIPTION OF THE INVENTION

Figure 1A:
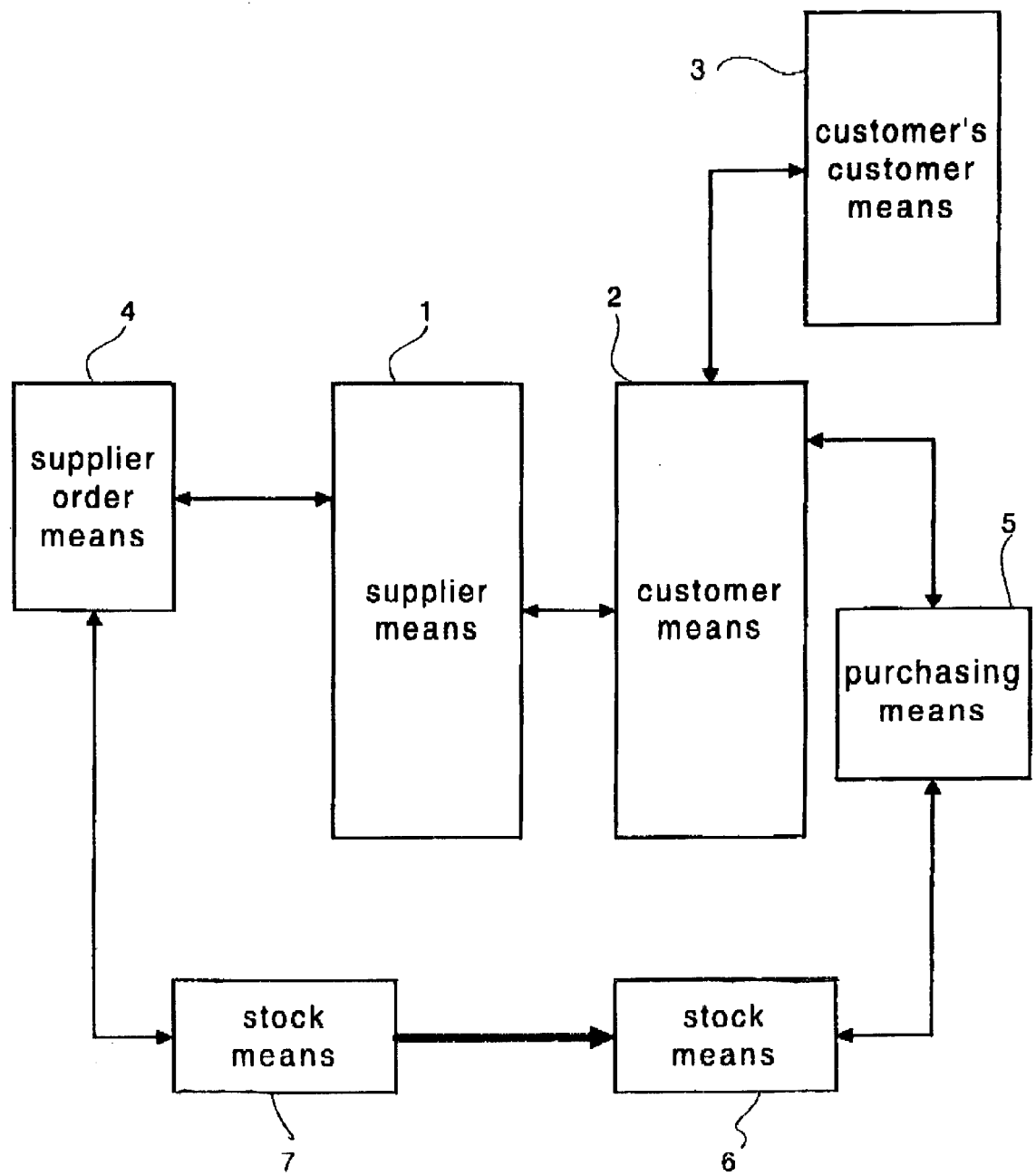
FIG. 1A is a block diagram of a first embodiment of a system for supply chain control according to the invention.

A block diagram of an embodiment of a supply chain control system according to the present invention, for the control of the flow and balance of goods and related information from point of origin to point of consumption, is shown in FIG. 1A.

The point of origin to point of consumption in a real logistics system comprises several nodes for example at least a supplier, delivering goods to producers, delivering products to distributors, delivering products to shops, from which the customer buys the products. Thus, there are several possible supplier-customer-customer's customer connections in such a system. Therefore, the supply chain control system according to the invention comprises at least a supplier means 1, connected to at least a customer means 2, which in turn is connected to at least a customer's customer means 3. Thus, in one case the supplier means 1 corresponds to the supplier, the customer means 2 corresponds to the producer, and the customer's customer means corresponds to the distributor. In another case the supplier means corresponds to the producer, the customer means 2 corresponds to the distributor, and the customer's customer means 3 corresponds to the shop and so on.

Figure 1B:
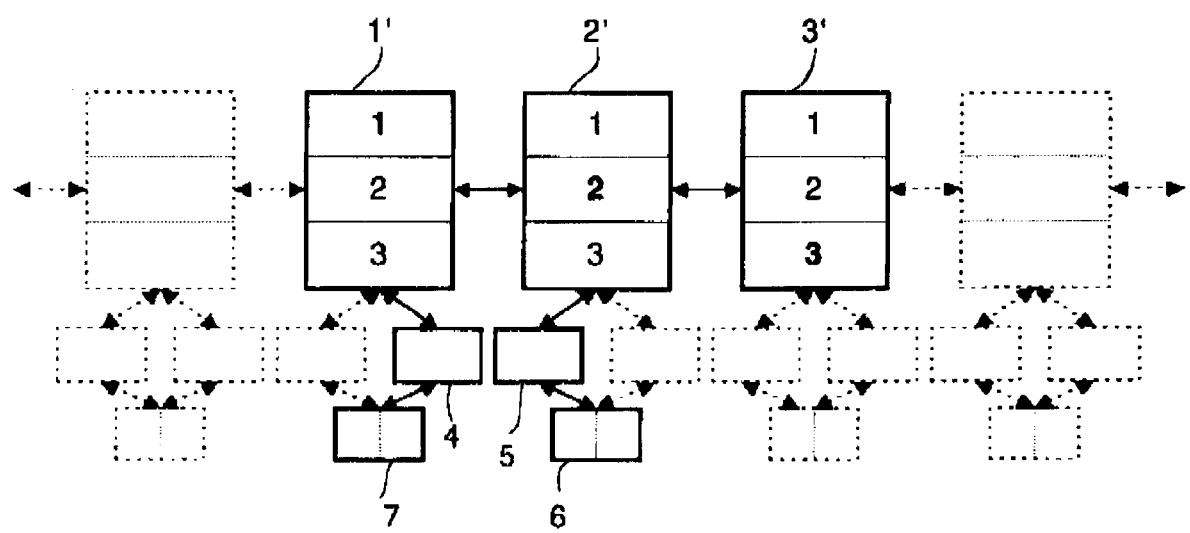
FIG. 1B is an illustrative view of a second embodiment of a block diagram of the system for supply chain control according to the invention.
Figure 1C:
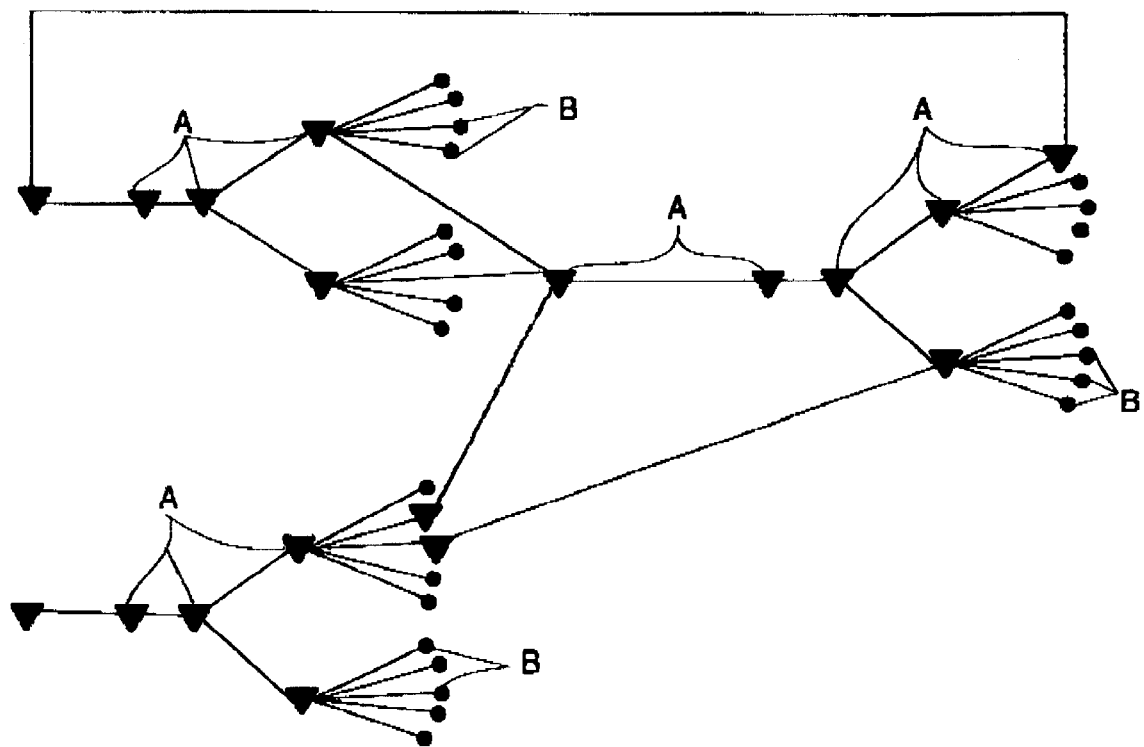
FIG. 1C is an illustrative view of a third embodiment of the system for supply chain control according to the invention.

Hence, the supply chain system according to the invention is applicable to a supply chain or network of arbitrary length, comprising several levels, as illustrated in FIGS. 1B and 1C.

The supply chain system according to the invention provides delivery automation, wherein a delivery suggestion is generated based on updated information from customers and suppliers. The data exchange is time regulated according to definitions set up in a business agreement between the customer means and its supplier means and is performed in real time.

In the following description, numerous specific details, such as system blocks and the number of steps in the method etc., are provided in detail in order to give a more thorough description of the present invention. However, it will be obvious for those skilled in the art that the present invention may be practiced without these specific details. Some well-known features are not described in detail so as not to make the present invention unclear. The supplier means, customer means and customer's customer means and other means presented in the description are preferably computer hardware of software entities or a combination thereof.

With reference to FIG. 1, the supplier means 1 comprises means for receiving customer product information, including customer product balance data, customer outflow demand data from the customer means 2, and customer's customer product information such as customer's customer product balance data and customer's customer outflow demand data from the customer's customer means 3 via the customer means 2. The product balance data is the available balance of a particular product excluding incoming and outgoing deliveries, and the outflow is the estimated flow of product units from the supplier means 1 to the customer means 2 or from the customer means 2 to the customer's customer means 3 per unit of time, for example a day.

Further the supplier means 1 comprises means for determining and storing a demand time for a refilling of balance of a customer storage means, based on the customer product information and delivery agreement data between the supplier means 1 and the customer means 2. The customer storage means or customer product storage means comprises product quantity information such as product balance. Additionally, the product information further comprises customer reception schedule data, i.e the days when reception of a delivery for a product is allowed; business agreement data, which is an agreement between the supplier and the customer defining how and when an information exchange will take place; virtual product balance, including the current product balance and the incoming deliveries of the product, in order to determine the demand time. The demand time is the next possible time when the safety time in the customer storage means is equaled and when reception is allowed according to the customer business calendar data and customer storage reception schedule data.

The demand time is the time point when the stock has gone below the safety stock safety time * storage outflow demand). This time point is due to the storage outflow demand, its virtual balance, and the customer business calendar.

Based on the schedule data it is determined if the demand time is a reception day; if not the demand time is assigned a reception time before the current demand time.

Means for determining and storing a delivery time and customer demand quantity data, for the customer storage means, based on the customer product information, the delivery agreement data, and the demand time is included in the supplier means.

The delivery time is the time when a suggested delivery has to begin at the supplier due to the demand time. If the generated delivery time is in conflict with a supplier business calendar, comprising information concerning the flow, the delivery time is assigned a reception time before the current generated delivery time, or if the generated delivery time is late on a delivery suggestion information object is not generated. However, if the delivery time is already passed, a new delivery time is determined.

The demand quantity is the quantity to be filled in the customer storage means at the demand time. A maximum quantity is calculated for the customer storage. The maximum quantity is the maximum time in the stock for a product multiplied by the outflow demand. Next, a consumption value until the demand time is calculated and the demand quantity is assigned the value according to the following expression:

demand quantity=maximum quantity+consumption value−customer virtual product balance in which the customer virtual product balance is the current product balance in the customer storage means together with incoming delivery quantities for the product.

If the delivery quantity is below a smallest delivery quantity, the smallest delivery quantity is stored as delivery quantity, and if the delivery quantity is bigger than one muliple unit, the delivery quantity is rounded to an even number of multiple units and stored in the supplier means.

Also means for creating a delivery suggestion information object, comprising the demand time, the delivery time, and the demand quantity data and means for executing a delivery corresponding to the delivery suggestion information object is included in the supplier means 1. Additionally, there is means included in the supplier means adjusting the suggested delivery quantity due to possible requirements on delivery in multiple units. The system also comprises means for executing the delivery, described later.

Figure 2:
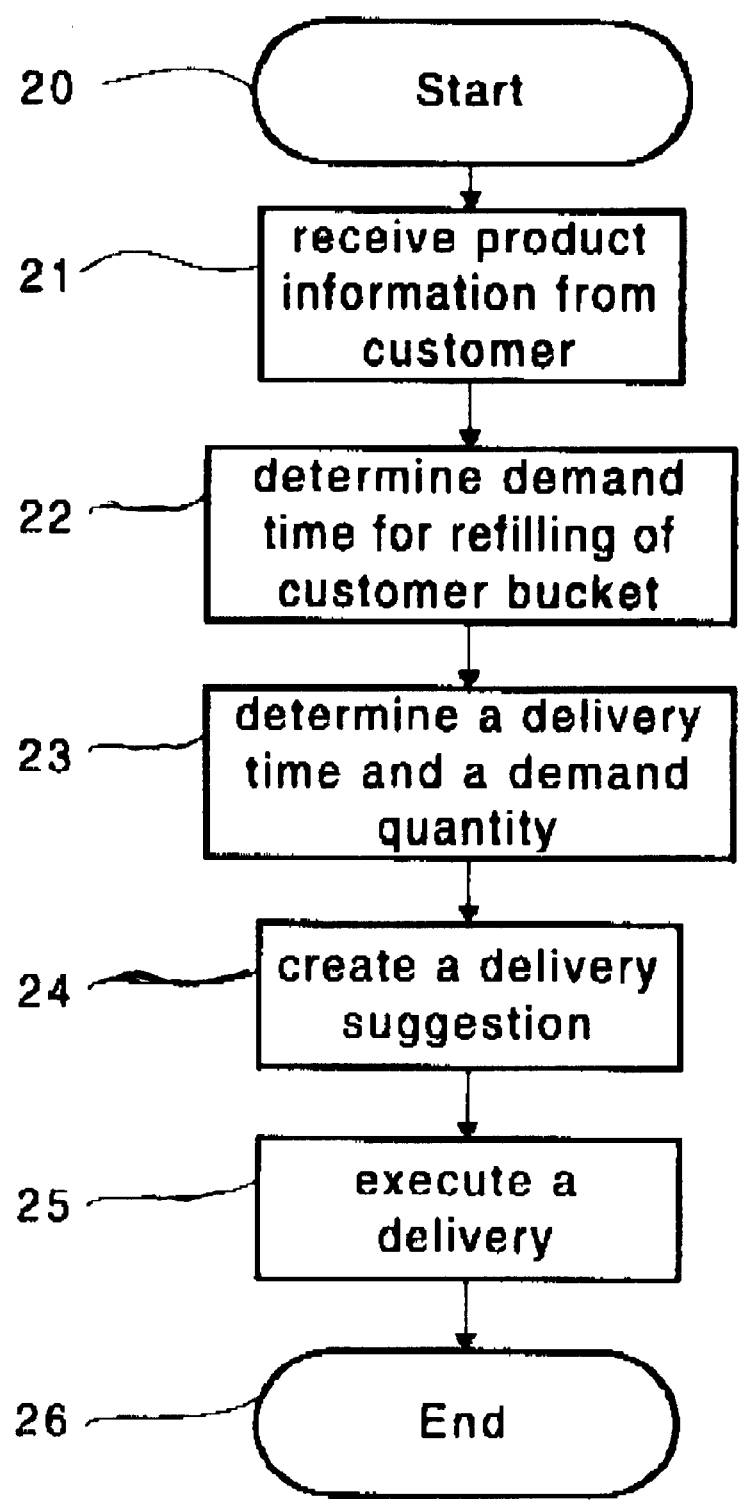
FIGS. 2, 3 and 4 are flow-charts illustrating the method for supply chain control according to the invention.
Figure 3:
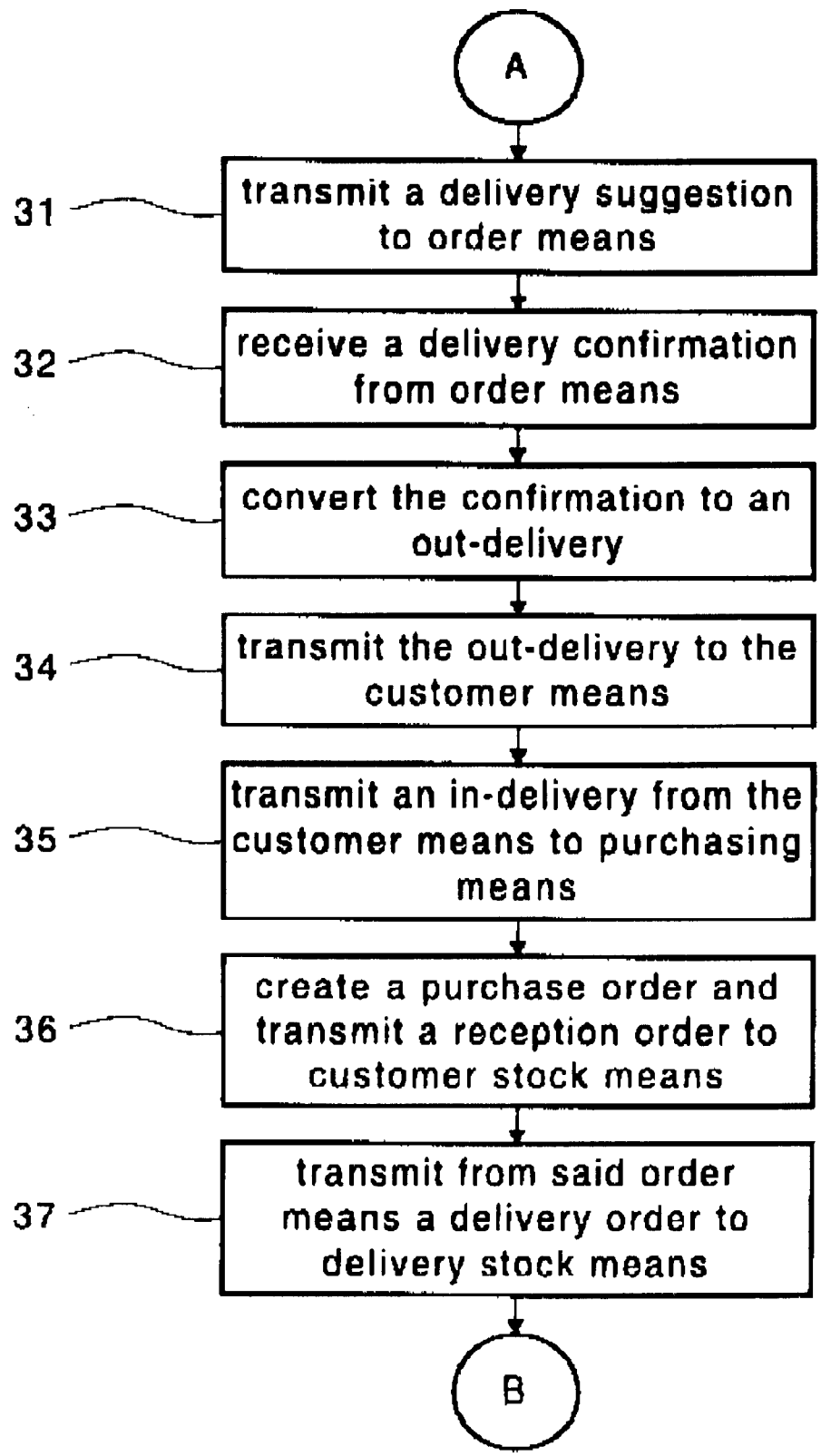
Figure 4:
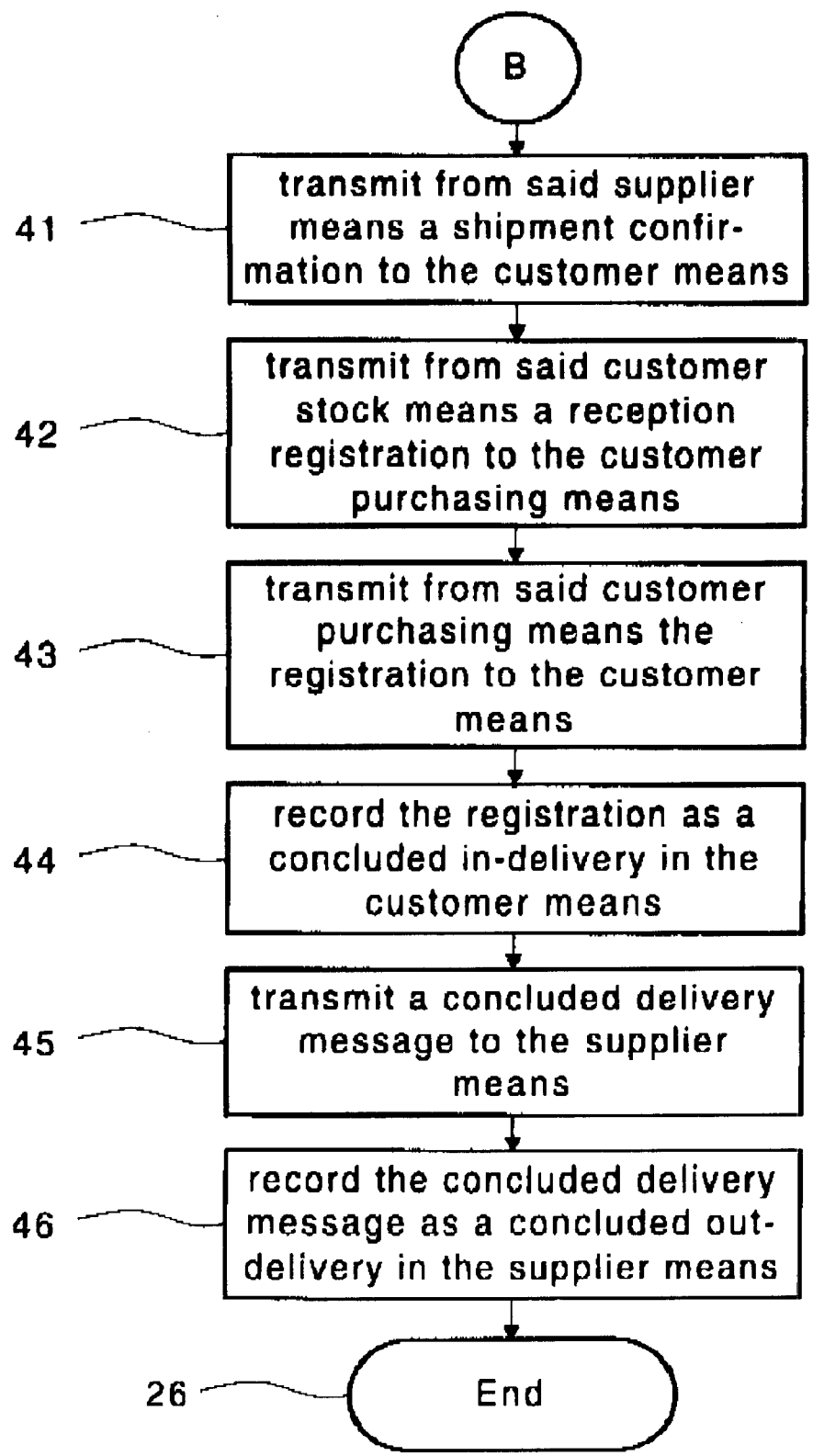

The method of controlling the flow and balance of goods and related information from point of origin to point of consumption in a logistics system according to the invention is illustrated in the flow-charts of FIGS. 2–4.

With reference to FIG. 2, the method of delivery automation starts at step 20 and the supplier means 1 receives the customer and customer's customer product information, comprising at least customer product balance data and customer outflow demand data, and customer's customer product balance data and customer's customer outflow demand data from the customer means 2 at step 21. Based on the customer product information and delivery agreement data between the supplier means and the customer means, the demand time is determined and stored in the supplier means at step 22 for a refilling of the customer storage means.

Based on the customer product information, the delivery agreement data, and the demand time, a delivery time, and customer demand quantity data for the customer storage means are determined and stored in the supplier means at step 23. The delivery suggestion information object comprising the demand time, the delivery time, and the demand quantity data is created at step 24, a delivery corresponding to the delivery suggestion information object is executed at step 25 and the method is finished at step 26.

The flow-charts in FIGS. 3 and 4 illustrate the step 25 in FIG. 2 in further detail. As illustrated by the flow-chart in FIG. 3 starting at A the delivery suggestion information object is transmitted from the supplier means to the order means 4 at step 31, and a delivery confirmation information object is transmitted from the order means 4 back to the supplier means 1 at step 32. At step 33, the delivery confirmation information object is converted to an out-delivery information object, which is transmitted to the customer means at step 34.

An in-delivery information object based on the out-delivery information object is transmitted from the customer means to a customer purchasing means 5 at step 35. The purchasing means 5 creates a purchase order information object and transmits a reception order information object to a customer stock means 6 at step 36, and a delivery order information object is transmitted from the order means 4 to a delivery stock means 7 at step 37.

Not shown in the drawings, a shipment registration information object is transmitted from the stock means 7 to the supplier means 1 through the order means 4.

However, this shipment registration does not have to be performed if the delivery confirmation comprises a shipment indication.

Proceeding from B in FIG. 3 to the corresponding B in FIG. 4, a shipment confirmation information object is transmitted from the supplier means 1 to the customer means 2 at step 41 and a reception registration information object is transmitted from the customer stock means 6 to the customer purchasing means 5 at step 42. The reception registration information object is transmitted from the customer purchasing means 5 to the customer means 2 at step 43, and the reception registration information object is recorded as a concluded in-delivery in the customer means 2 at step 44.

A concluded delivery information object is transmitted to the supplier means 1 at step 45 and recorded as a concluded out-delivery in the supplier means 1 at step 46, and the method ends up in step 26.

If a supplier product balance is less than the suggested delivery quantity the current product balance is distributed among present delivery suggestion information objects.

Although the invention has been described by way of a specific embodiment thereof it should be apparent that the present invention provides a system and method for supply chain control that fully satisfy the aims and advantages set forth above, and alternatives, modifications and variations are apparent to those skilled in the art.

For example, suppliers, customers, and customer's customer means, respectively, can be located in computer systems connected to and exchanging information and data via the Internet, or an intranet etc.

In an alternative embodiment of the invention the supplier order means, purchasing means and stock means are incorporated in the supplier means; and customer order means, purchasing means and stock means are incorporated in the customer means.

As mentioned above, the supply chain system according to the invention can operate as a stand alone system, in a chain as illustrated in FIGS. 1A and 1B, or in a network as illustrated in FIG. 1C.

In the embodiment of the system for supply chain control according to the invention shown in FIG. 1B each block 1', 2', and 3' comprises supplier means 1, customer means 2, customer's customer means 3. Thus, the supplier means 1 of block 1' communicates with the customer means 2 of the block 2', which communicates with the customer's customer means 3 of the block 3'. The broken rectangles represent corresponding means on each level in the chain.

Similarly, in the embodiment of the system for supply network control according to the invention shown in FIG. 1C each node A comprises supplier means 1, customer means 2, customer's customer means 3, order means 4, purchasing means 5 and stock means 6 and 7 in order to make the logistics system operate properly. For example, a distributor operates as a supplier for a shop, a customer to a producer and a customer's customer to a supplier and, consequently, all the functions provided by the different means 1, 2 and 3 mentioned above are necessary in each node. A leaf B or end customer comprises either the same means as the nodes A or a less complex version of the system including only customer means 2, purchasing means 5, and stock means 6.

Additionally each supplier means is connected to one or several customer means, which are connected to one or several customer's customer means. Further, the customer means operate as suppliers for the customer's customer means and each supplier may operate as a customer for one or several other suppliers.

Additionally, the system according to the invention comprises means for measuring of the fill rate in the whole or parts of the system. The fill rate is the ratio between the virtual balance and the maximum balance.

What is claimed is:

1. A method of controlling the flow and balance of goods and related information from point of origin to point of consumption in a logistics system, comprising the steps of:

receiving by a supplier customer product information including at least customer product balance data and customer outflow demand data, and customer's customer product balance data and customer's customer outflow demand data;

based on said customer product information and delivery agreement data between said supplier and said customer, determining and storing by said supplier a demand time for a refilling of a customer inventory;

based on said customer product information, said delivery agreement data, and said demand time, determining and storing by said supplier a delivery time, and customer demand quantity data for said customer inventory; and creating a delivery suggestion comprising said demand time, said delivery time, and said demand quantity data.

2. The method according to claim 1, further comprising the step of:

executing a delivery corresponding to said delivery suggestion information object.

3. The method according to claim 2, further comprising the steps of:

transmitting from said supplier said delivery suggestion;

receiving a delivery confirmation by said supplier;

converting said delivery confirmation to an out-delivery information object;

transmitting said out-delivery to said customer;

transmitting from said customer an in-delivery based on said out-delivery to a customer;

by said customer, creating a purchase order and transmitting a reception order to a customer;

transmitting a delivery order;

transmitting from said supplier a shipment confirmation to said customer;

transmitting from said customer a reception registration to said customer;

transmitting from said customer said reception registration to said customer;

recording said reception registration as a concluded in-delivery by said customer;

transmitting a concluded delivery to said supplier; and recording said concluded delivery as a concluded out-delivery in said supplier.

4. The method according to claim 2, further comprising the steps of:

transmitting from said supplier said delivery suggestion;

receiving a delivery confirmation by said supplier;

converting said delivery confirmation to an out-delivery information object;

transmitting said out-delivery to a customer;

transmitting from said customer an in-delivery based on said out-delivery to said customer;

by said customer, creating a purchase order and transmitting a reception order;

transmitting a delivery order;

transmitting a shipment registration;

transmitting said shipment registration to said supplier;

transmitting from said supplier a shipment confirmation to said customer;

transmitting from said customer a reception registration to said customer;

transmitting from said customer said reception registration to said customer;

recording said reception registration as a concluded in-delivery by said customer;

transmitting a concluded delivery to said supplier; and recording said concluded delivery as a concluded out-delivery by said supplier.

5. The method according to claim 1, wherein said product information further comprises customer storage reception schedule data, customer business calendar data, and customer virtual product balance in order to determine said demand time.

6. The method according to claim 5, wherein the step of determining and storing in said supplier means a demand time further comprises the step of:

based on said schedule data determining if said demand time is a reception day; if not assigning said demand time a reception time before said demand time.

7. The method according to claim 6, wherein the step of determining and storing by said supplier a delivery time further comprises the steps of:

determining if said generated delivery time is in conflict with a supplier business calendar, if so, said delivery time is assigned a reception time before said current generated delivery time, or if said generated delivery time is late on a delivery suggestion is not generated.

8. The method according to claim 1, wherein the step of determining and storing in said supplier means a delivery time further comprises the step of:

if said delivery time is already passed, determining a new delivery time.

9. The method according to claim 1, wherein the step of determining and storing by said supplier a demand quantity further comprises the steps of:

calculating a maximum quantity for said customer inventory;

calculating a consumption value until said demand time; and determining said demand quantity from said maximum quantity, said consumption value and said customer virtual product balance.

10. The method according to claim 1, further comprising, before the step of creating a delivery suggestion, the steps of:

determining if said delivery quantity is below a smallest delivery quantity, storing said smallest delivery quantity as delivery quantity; and determining if said delivery quantity is bigger than one multiple unit, rounding said delivery quantity to an even number of multiple units and storing it by said supplier.

11. The method according to claim 1, further comprising the steps of:

determining if a supplier product balance is less than said suggested delivery quantity; if so distributing said current product balance among present delivery suggestion information objects.

12. The method according to claim 1, wherein said customer product information is received in real time.

13. A logistics system for controlling the flow and balance of goods and related information from point of origin to point of consumption, comprising at least a supplier means connected to at least a customer means, comprising:

means for receiving customer product information comprising at least customer product balance data and customer outflow demand data from said customer means, and customer's customer product balance data and customer's customer outflow demand data from a customer's customer means, means for determining and storing in said supplier means a demand time for a refilling of a customer storage means based on said customer product information and delivery agreement data between said supplier means and said customer means;

means for determining and storing in said supplier means a delivery time for said customer storage means, based on said customer product information, said delivery agreement data, and said demand time; and means for creating a delivery suggestion comprising said demand time, said delivery time, and said demand quantity data.

14. The logistics system according to claim 13, further comprising:

means for executing a delivery corresponding to said delivery suggestion message.

15. The logistics system according to claim 14, further comprising:

means for transmitting from said supplier means said delivery suggestion to an order means;

means for transmitting from said order means a delivery confirmation back to said supplier means;

means for converting said delivery confirmation to an out-delivery information object;

means for transmitting said out-delivery to said customer means;

means for transmitting from said customer means an in-delivery based on said out-delivery to a customer purchasing means;

means for creating a purchase order and transmitting a reception order to a customer stock means;

means for transmitting from said order means a delivery order to delivery stock means;

means for transmitting from said supplier means a shipment confirmation to said customer means;

means for transmitting from said customer stock means a reception registration to said customer purchasing means;

means for transmitting from said customer purchasing means said reception registration to said customer means;

means for recording said reception registration as a concluded in-delivery in said customer means;

means for transmitting a concluded delivery to said supplier means; and means of recording said concluded delivery as a concluded out-delivery in said supplier means.

16. The logistics system according to claim 15, characterized by means for transmitting from said delivery stock means a shipment registration to said order means; and means for transmitting from said order means said shipment registration to said supplier means.

17. The logistics system according to claim 13, wherein said product information further comprises customer storage reception schedule data, customer business calendar data, and customer virtual product balance in order to determine said demand time.

18. The logistics system according to claim 17, further comprising:

means for determining if said demand time is a reception day based on said schedule data; and means for assigning said demand time a reception time before said demand time if said demand time is not a reception day.

19. The logistics system according to claim 17, further comprising:

means for determining if said generated delivery time is in conflict with a supplier business calendar, and means for assigning said delivery time a reception time before said current generated delivery time if said generated delivery time is in conflict with a supplier business calendar.

20. The logistics system according to claim 13, further comprising:

means for determining a new delivery time if said delivery time is already passed.

21. The logistics system according to claim 13, further comprising:

means for calculating a maximum quantity for said customer storage;

means for calculating a consumption value until said demand time; and means for determining said demand quantity from said maximum quantity, said consumption value and said customer virtual product balance.

22. The logistics system according to claim 13, further comprising:

means for determining if said delivery quantity is below a smallest delivery quantity, means for storing said smallest delivery quantity as delivery quantity, and means for determining if said delivery quantity is bigger than one multiple unit, rounding said delivery quantity to an even number of multiple units and storing it in said supplier means.

23. The logistics system to claim 13, further comprising:

means for determining if a supplier product balance is less than said suggested delivery quantity; and means for distributing said current product balance among present delivery suggestion information objects.

24. The logistics system according to claim 13, wherein said system operates in a network, including several nodes, wherein each node comprises supplier means, customer means, customer's customer means.

25. The logistics system according to claim 24, wherein said node comprises order means, purchasing means and stock means.

26. The logistics system according to claim 13, further comprising means for measuring of a fill rate in the system.

27. The logistics system according to claim 26, wherein said fill rate is the ratio between the virtual balance and the maximum balance.

* * * * *